(12) United States Patent
Venturino et al.

(10) Patent No.: US 6,970,199 B2
(45) Date of Patent: Nov. 29, 2005

(54) DIGITAL CAMERA USING EXPOSURE INFORMATION ACQUIRED FROM A SCENE

(75) Inventors: Michael Venturino, Geneseo, NY (US); James E. McGarvey, Hamlin, NY (US); Michael A. Vaughn, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/971,156

(22) Filed: Oct. 5, 2001

(65) Prior Publication Data

US 2003/0067551 A1     Apr. 10, 2003

(51) Int. Cl.$^7$ .................. H04N 5/222; H04N 5/235; G06K 9/40
(52) U.S. Cl. ................ 348/333.02; 348/333.01; 348/333.12; 348/362; 382/274
(58) Field of Search ............... 348/366, 333.03, 348/364, 362, 363, 231.8, 231.9, 333.02, 348/333.12; 396/223, 245, 234

(56) References Cited

U.S. PATENT DOCUMENTS

| | | | | |
|---|---|---|---|---|
| 4,448,506 A | * | 5/1984 | Saegusa et al. ............ 354/431 |
| 4,460,263 A | * | 7/1984 | Gfeller et al ............... 354/415 |
| 5,036,400 A | * | 7/1991 | Haruki ....................... 358/228 |
| 5,164,831 A |   | 11/1992 | Kuchta et al. .............. 358/209 |
| 5,280,359 A | * | 1/1994 | Mimura et al. ............. 358/228 |
| 5,353,058 A | * | 10/1994 | Takei ......................... 348/363 |
| 5,455,685 A | * | 10/1995 | Mori .......................... 348/363 |
| 5,486,861 A | * | 1/1996 | Miyamoto et al. .......... 348/362 |
| 5,610,654 A |   | 3/1997 | Parulski et al. ............. 348/229 |
| 5,706,049 A | * | 1/1998 | Moghadam et al .... 348/333.03 |
| 5,745,810 A | * | 4/1998 | Matsushima ................ 396/234 |
| 5,959,670 A | * | 9/1999 | Tamura et al. .............. 348/364 |
| 6,657,658 B2 | * | 12/2003 | Takemura .............. 348/207.99 |
| 2001/0010561 A1 | * | 8/2001 | Nagai ......................... 348/371 |
| 2001/0013902 A1 | * | 8/2001 | Kawabe ................. 348/333.03 |
| 2001/0019364 A1 | * | 9/2001 | Kawahara ................... 348/362 |
| 2001/0020978 A1 | * | 9/2001 | Matsui et al. ............... 348/222 |
| 2002/0008771 A1 | * | 1/2002 | Uchino et al ............... 348/362 |
| 2002/0012065 A1 | * | 1/2002 | Watanabe ................... 348/364 |
| 2002/0030754 A1 | * | 3/2002 | Sugimoto ............. 348/333.02 |
| 2003/0063213 A1 | * | 4/2003 | Poplin ........................ 348/362 |

FOREIGN PATENT DOCUMENTS

JP          03-106278      *  5/1991     ............ H04N 5/91

* cited by examiner

Primary Examiner—David L. Ometz
Assistant Examiner—Brian Genco
(74) Attorney, Agent, or Firm—Raymond L. Owens (57) ABSTRACT

A method of improving a digital image captured by a digital camera includes using the digital camera to capture a first image of a scene and having a display to display the first captured image; identifying a portion of the displayed image of the first captured image, which has exposure critical scene content; producing exposure information from such portion and displaying such information on the display which will permit a camera user to adjust the exposure of the image; and adjusting the exposure of the camera based on such exposure information and capturing a second image of the scene.

23 Claims, 6 Drawing Sheets

DIGITAL CAMERA USING EXPOSURE INFORMATION ACQUIRED FROM A SCENE

FIELD OF THE INVENTION

The present invention relates to producing improved digital images captured by a digital camera.

BACKGROUND OF THE INVENTION

Digital cameras, such as the Kodak DCS 620 camera, capture images of a scene using a solid state image sensor, and store the resulting image data on a removable memory device, such as a PCMCIA type III hard drive. Thumbnails of the captured images can be displayed on the camera's color LCD screen. Since scenes can have a wide range of illumination levels, these cameras include automatic exposure controls in order to adjust the camera lens f/number and exposure time to compensate for the scene illumination level. However, because of the varying reflectance levels of objects within a scene, and the limited dynamic range of image sensors, such automatic exposure control often produces unacceptable results for professional photographers.

As a result, such digital cameras include manual exposure overrides. The photographer can review a captured image on the camera's LCD image display to determine if the captured scene appears lighter or darker than desired, adjust the exposure settings, and can take a second picture. However, because of the small size and limited picture quality of the LCD display, it is impossible to make critical exposure judgements using the displayed image. As a result, this method is useful only for providing very coarse exposure adjustments.

Once the images are captured by a digital camera, such as the DCS 620, they can be downloaded to a computer and processed and displayed. For example, an image processing program such as Photoshop version 6.0 or later by Adobe Systems Inc., San Jose, Calif. can be used to display and edit a captured image. Photoshop version 6.0 or later includes an "info tool" which displays the RGB code values of a particular pixel when the user lingers the cursor over a particular image area. The displayed values are the RGB code values of the processed pixels from the camera, which may include many types of non-linear quantization and processing. As a result, it is not possible to easily relate the RGB code values to the sensor exposure values of the camera when the scene was captured. Furthermore, these displayed code values are available only after the images are downloaded to the computer, and not as the images are being captured.

What is needed is a digital camera that provides an easy way for the photographer to understand the sensor exposure values for different areas of a scene as the scene is captured, so that any desired exposure corrections can be made and the scene can be immediately recaptured.

SUMMARY OF THE INVENTION

It is an object of the present invention to allow a user to select critical scene content from a displayed digital image on the camera display and to provide information necessary to make exposure adjustments and capture another image of the scene.

This object is achieved by a method of improving a digital image captured by a digital camera, comprising the steps of:

a) using the digital camera to capture a first image of a scene and having a display to display the first captured image;

b) identifying a portion of the displayed image of the first captured image, which has exposure critical scene content;

c) producing exposure information from such portion and displaying such information on the display which will permit a camera user to adjust the exposure of the image; and d) adjusting the exposure of the camera based on such exposure information and capturing a second image of the scene.

ADVANTAGES

It is an advantage of the present invention that a photographer can immediately view exposure information for areas of a scene having exposure critical scene content.

It is a further advantage of the present invention to display exposure information for areas of a scene having exposure critical scene content using a metric which is well known to professional photographers.

It is a further advantage of the present invention to display exposure information for areas of a scene having exposure critical scene content and to use the exposure information to automatically adjust the camera exposure settings.

DETAILED DESCRIPTION OF THE INVENTION

Figure 1:
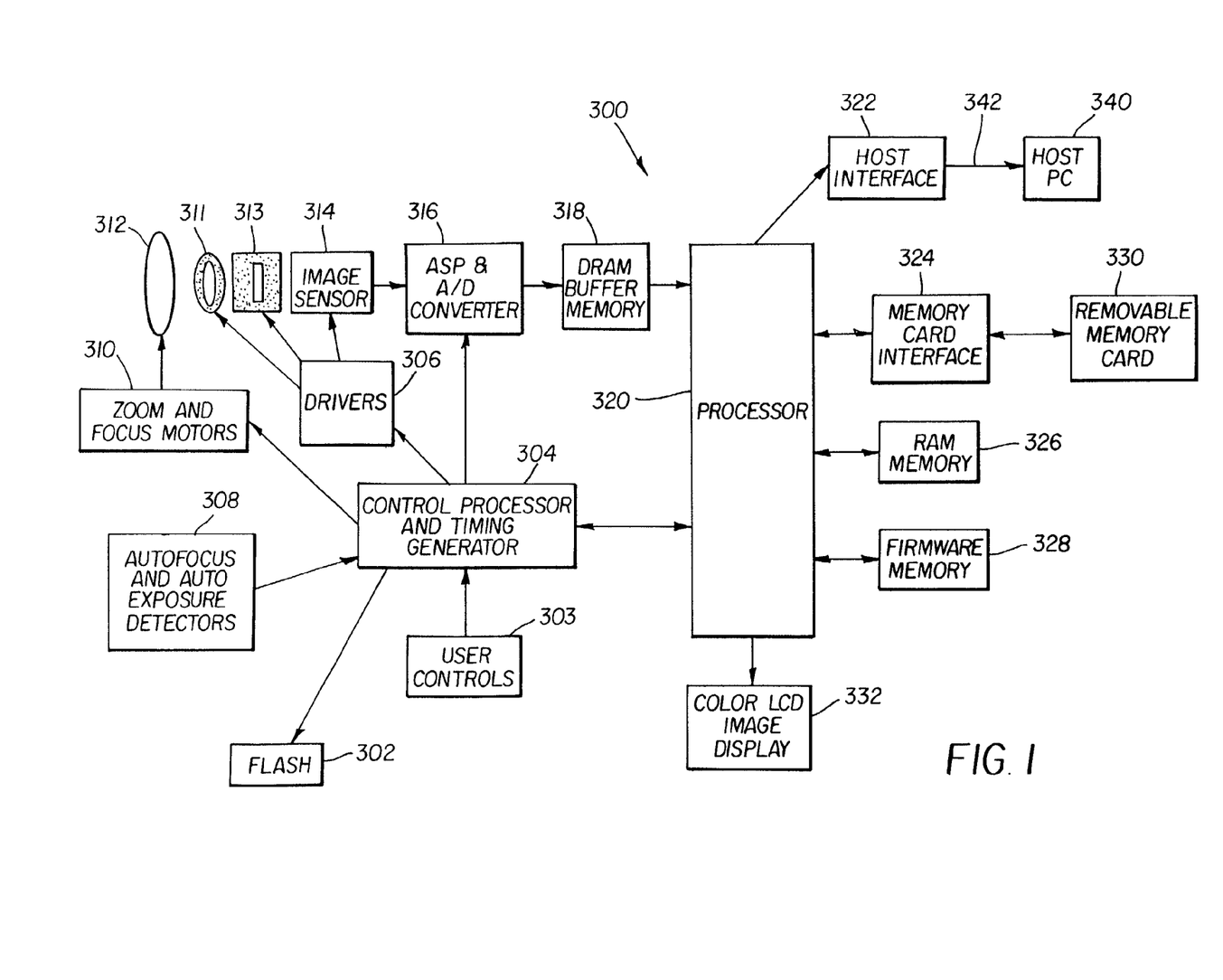
FIG. 1 is a block diagram of a digital camera which implements the method of the present invention.

FIG. 1 is a block diagram of a digital camera which implements the method of the present invention. The digital camera 300 produces digital images that are stored on the removable memory card 330. The digital camera 300 includes a zoom lens 312 having zoom and focus motor drives 310 and an electrically adjustable aperture 311 and an electrically driven mechanical shutter 313. The zoom lens 312 focuses light from a scene (not shown) on an image sensor 314, for example, a single-chip color CCD image sensor, using the well known Bayer color filter pattern. The aperture 311, shutter 313, and image sensor 314 are controlled by drivers 306. The zoom and focus motors 310 and the drivers 306 are controlled by control signals supplied by a control processor and timing generator circuit 304.

The control processor and timing generator 304 receives inputs from autofocus and autoexposure detectors 308 and controls a flash 302. The analog output signal from the image sensor 314 is amplified and converted to digital data by the analog signal processing (ASP) and analog-to-digital (A/D) converter circuit 316. The ASP and A/D 316 includes a programmable electrical gain that can be used to adjust the effective ISO speed setting of the camera. This can be done as described in commonly-assigned U.S. Pat. No. 5,610,654 to Parulski, et. al., the disclosure of which is herein incorporated by reference. The digital data is stored in a DRAM buffer memory 318 and subsequently processed by a processor 320 controlled by the firmware stored in the firmware memory 328, which can be flash EPROM memory. Alternatively, the processor 320 can be provided by custom circuitry (e.g. by one or more custom integrated circuits [ICs] design only for use in digital cameras), or by a combination of programmable processor(s) and custom circuits.

The processed digital image file is provided to a memory card interface 324 which stores the digital image file on the removable memory card 330. Removable memory cards 330 are known to those skilled in the art. For example, the removable memory card 330 can include memory cards adapted to the PCMCIA card interface standard, as described in the PC Card Standard, Release 2.0, published by the Personal Computer Memory Card international Association, Sunnyvale, Calif., September 1991, or to the *CompactFlash Specification Version* 1.3, published by the CompactFlash Association, Palo Alto, Calif., Aug. 5, 1998. Other types of removable memory cards, including Smart Memory cards, Secure Digital (SD) cards, and Memory Stick cards, or other types of digital memory devices, such as magnetic hard drives, magnetic tape, or optical disks, could alternatively be used to store the digital images.

In some embodiments, the processor 320 performs color interpolation followed by color and tone correction, in order to produce rendered sRGB image data. The rendered sRGB image data is then JPEG compressed and stored as a JPEG image file on the removable memory card 330. In other embodiments, the processor directly compresses the Bayer color image data from the image sensor, and stores the compressed data on the removable memory card 330, and the image is later "finished" by processing the compressed Bayer color image data using the host PC 340.

The processor 320 also creates a "thumbnail" size image that is stored in RAM memory 326 and supplied to the color LCD image display 332, which displays the captured image for the user to review. Instead of a color LCD image display, the digital camera 300 could use an organic light emitting diode (OLED) display, or many other types of image displays. The thumbnail image can be created as described in commonly-assigned U.S. Pat. No. 5,164,831 to Kuchta, et. al., the disclosure of which is herein incorporated by reference. The digital camera 300 is controlled by user controls 303, such as a series of user buttons including a shutter release (e.g., capture button) (not shown) which initiates a picture taking operation. The graphical user interface displayed on the color LCD image display 332 is controlled by the user interface portion of the firmware stored in the firmware memory 328.

After a series of images have been taken and stored on the removable memory card 330, the removable memory card 330 can be inserted into a card reader (not shown) in host PC 340. Alternatively, an interface cable 342 can be used to connect between the host interface 322 in the digital camera 300 and the host PC 340. The interface cable 342 can conform to, for example, the well known IEEE 1394 interface specification, the universal serial bus (USB) interface specification, or other wired or wireless interface specifications.

Alternatively, the digital camera 300 could be comprised of a digital back for a 35 mm or medium format film camera.

In this case, the zoom lens 312, aperture 311, and shutter 313 are provided as part of the film camera body, and the other components, including the image sensor 314, image processor 320 and color LCD image display 332, are provided as part of a separate digital camera back that is connected to the film camera body. The connection preferably includes an electrical connector (not shown), so that the zoom lens 312, aperture 311, and shutter 313 can be controlled by the control processor and timing generator 304 in the digital back.

Figure 2:
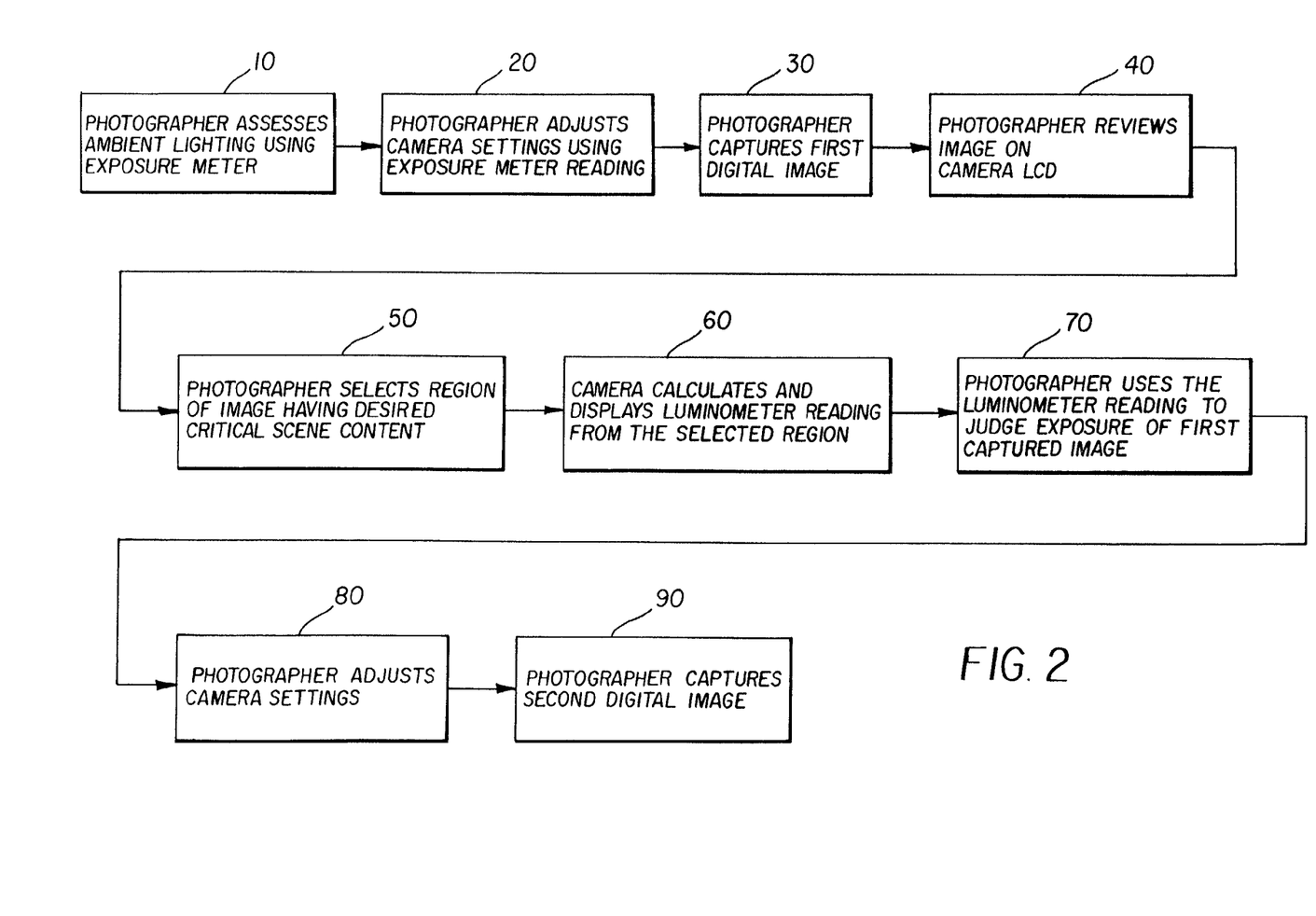
FIG. 2 is a flow diagram showing the steps of practicing a first embodiment of the present invention.

FIG. 2 is a flow diagram showing the steps of practicing a first embodiment of the present invention. In block 10, the photographer prepares to capture a digital image. Typically, this is done by first determining the amount of light falling on the scene using an incident light meter, or alternatively using a reflected light meter to measure the amount of light reflected from various portions of the scene. In controlled photography, such as studio photography, the photographer may arrange lighting in order to illuminate the scene in a desired manner.

In block 20, the photographer adjusts the camera settings based on the scene to be captured. Typically, the photographer manually adjusts the camera settings based on the meter readings made in block 10, although the photographer may alternatively use the automatic exposure mode to automatically set the camera settings. This eliminates the need for the meter reading in block 10. The camera settings that can be adjusted include the camera's exposure time (e.g. camera shutter speed), the camera's effective ISO speed setting, and the lens aperture.

In block 30, the photographer uses the digital camera 300 to capture a first image of the scene. The photographer presses the camera shutter button on the digital camera 300 to begin the exposure sequence. The control processor and timing generator 304 controls the aperture 311, the shutter 313, and the gain of the ASP and A/D converter 316 in order to provide the camera settings that were manually or automatically selected in block 20. Using these exposure settings, an image is captured by the image sensor 314 and the resulting digital image data is stored in DRAM buffer 318. The image is then processed and stored on the removable memory card 330 as described earlier in reference to FIG. 1.

Figure 5:
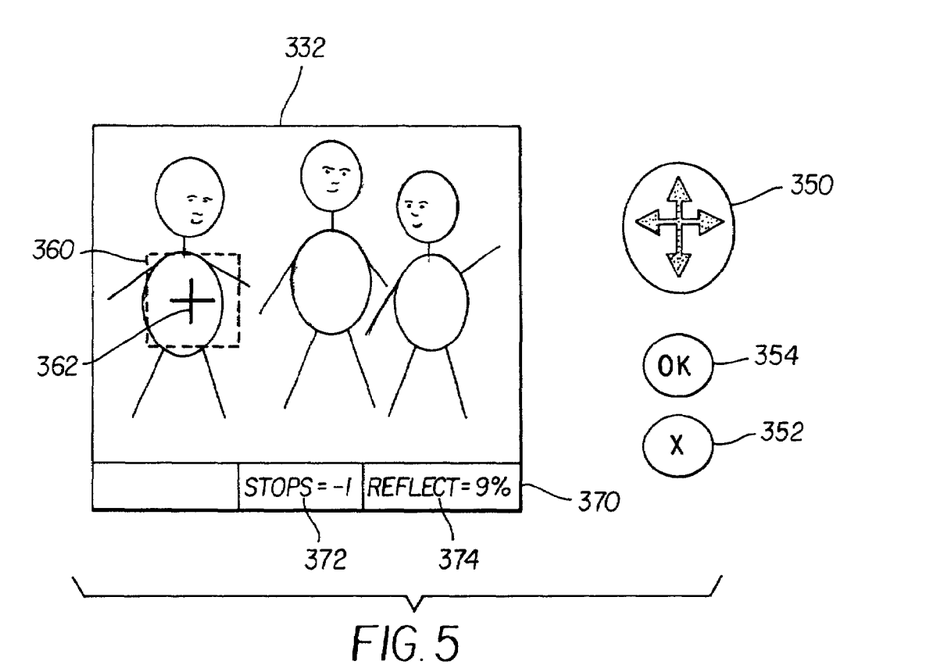
FIG. 5 depicts the rear of the camera including the image display and the user controls.

In block 40, the photographer, using user controls 303, displays the captured image on the color LCD image display 332. FIG. 5 depicts the rear of the digital camera 300 including the color LCD image display 332 and some of the user controls 303, including the four-way controller (e.g. four-way switch buttons) 350, a cancel button 352, and an OK button 354.

In block 50, the photographer selects a region of the displayed image having exposure critical scene content, so that the exposure related readings for this area of the scene can then be measured and displayed in block 60. A region of an image having exposure critical scene content can be, for example, the high specular reflections off the portion of the face of the subject of a portrait image. Another region of an image having exposure critical scene content can also be, for example, the shadow region of a product that is being captured for commercial advertising purposes. Still another region of an image having exposure critical scene content can be, for example, the neutral gray card of known reflectance positioned in a test image in order to critically set the exposure of a subsequent image. The neutral card can be used to achieve an appropriate color balance for the image. The exposure-critical scene content may also include a Macbeth Color Checker, or some other exposure-appropriate reflectance test object that can be used to color balance or create a custom profile for an image.

To select the region of the displayed image having exposure critical scene content, the photographer can use the 4-way controller 350 to navigate to the camera's Zoom Mode. The Zoom Mode is accessed by pressing the bottom or the top of the 4-way controller 350 until the Zoom Mode is displayed. When the Zoom Mode is active, the current image is displayed, overlaid with a disabled region of interest (ROI) box 360. The region of interest (ROI) box 360 is a square-shaped display overlay that serves two purposes: (1) it is an indicator of the image area that is viewable on the LCD when zoomed to the next level, and (2) its appearance serves as feedback regarding the functional mode of the 4-way switch.

When the ROI box 360 is enabled, manipulation of the 4-way controller 350 results in corresponding movement of the ROI box 360. When the ROI box 360 is enabled, pressing the cancel button 352 disables the ROI box 360. When the ROL box 360 is disabled, manipulation of the horizontal axis of the 4-way controller 350 results in forward-backward navigation of image thumbnails. When the ROI box 360 is disabled, manipulation of the vertical axis of the 4-way controller 350 results in a change of Display Mode. When the ROI box 360 is disabled, pressing the OK Button 354 enables the ROI box 360.

In order to maximize the visibility of the ROI 360, the borders preferably consist of a dynamically moving series of black and white patterns (i.e., marching ants). The default location of the ROI box 360 is in the center of the image displayed on image display 332. When the position of the ROI box 360 for a thumbnail has been moved during a previous zoom procedure, the last position of the ROI box 360 is remembered and presented at the last-used location when that thumbnail is presented again. This can be accomplished by storing the last position of the ROI box 360, for each digital image stored on removable memory card 330, along with each image file, or alternatively in a table stored in RAM memory 326 or in firmware memory 328.

By default, image thumbnails are displayed on color LCD image display 332 at a 10% (1:16) zoom level. There are two higher magnification zoom levels with the Zoom Mode, 30% (1:4), and 100% (1:1). When the Zoom Mode is active, the current image is displayed, overlaid with the ROI box 360.

Once the photographer has zoomed the image and identified the exposure-critical scene content (though zooming may not always be necessary), the photographer places the luminometer crosshairs 362 over the exposure-critical scene content to enable the digital camera 300 to extract the desired information from the corresponding area of the captured image data, as will be described relative to block 60. The luminometer values 370 provide information about the level of the luminance level of the pixels at the location specified by the luminometer crosshairs 362.

The luminometer crosshairs 362 are normally located in the center of the ROI box 360, and move with the ROI box 360 only when it is moved. Movement of the crosshairs in a particular direction will continue in that direction until the side of the ROI box reaches the edge of the displayed thumbnail image. When the crosshairs reaches the edge of the displayed thumbnail image, further manipulation of the 4-way controller 350 will move the image thumbnail in the opposite direction of the crosshairs movement, until the edge the image is reached.

In block 60, the digital camera 300 displays the luminometer values 370 on the color LCD image display 332 for the exposure critical scene content area of image selected in block 50. The luminometer values 370 are preferably displayed in a lower portion of the color LCD image display 332, which serves as an information area. The luminometer values 370 preferably include two related metrics, the "stops" exposure value 372, and the "percent scene reflectance" value 374. The "stops" exposure value 372 preferably has a range of −3 to +3.25 stops, and changes in tenth stop increments within its range. The "percent scene reflectance" value 374 preferably has a range of 2% to 180%, and changes in 1% increments. The "stops" exposure value 372 preferably indicates the exposure level in photographic stops relative to the factory determined 18% gray level, so that 0 stops equals intended signal level from a 18% reflectance object in the scene.

Figure 6:
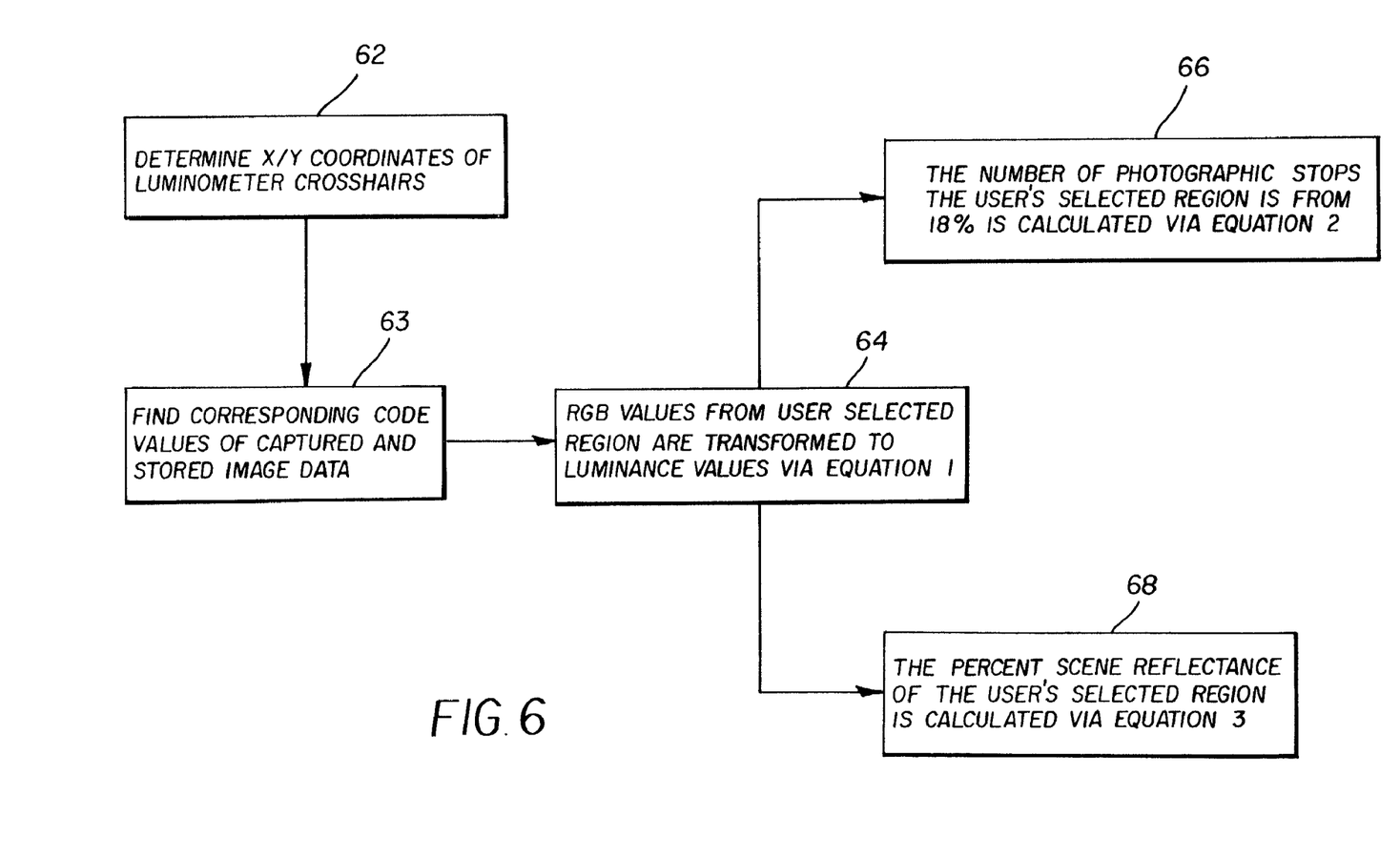
FIG. 6 shows in more detail the steps included in block 60 of FIG. 2 for calculating the exposure information.

In block 60, the exposure information that determines the luminometer values 370 is calculated for the exposure critical area of the image selected in block 50. The steps used to perform this calculation are shown in detail in FIG. 6. In block 50, the user used the LCD image display 332 to locate an exposure critical area of the image to analyze. The user selected the exposure critical area by placing the luminometer crosshairs 362 at the desired location. In block 62, the processor 320 determines the x/y coordinates of the first captured digital image corresponding to the exposure critical scene content selected by the user in block 50. In block 63, the linear camera RGB code values of the first captured image that correspond to the x/y coordinates determined in block 62 are obtained. In block 64, the linear camera RGB code values determined in block 63 are then transformed to luminance values (Y) via equation 1.

$$Y = 0.30RL + 0.59GL + 0.11BL \qquad \text{(Eqn 1)}$$

where RL, GL, and BL are the red, green, and blue linear camera code values captured by the image sensor at the x/y coordinate locations.

After the transformation to luminance (Y) in block 64, the luminometer values 370 are presented in two metrics. One metric is "stops" 372 and the other metric is "percent scene reflectance" 374.

The first metric, "stops" 372 is calculated from the area located by the luminometer crosshairs 362. The "stops" are calculated in block 66 via equation 2.

$$\text{"Stops" (relative to 18\% reflectance)} = [\log_{10}(Y/18P\text{Gray})]/\log_{10}(2)] \qquad \text{(Eqn 2)}$$

where 18PGray is the factory determined 18% signal level.

In a preferred embodiment, a 12 bit A/D is used in ASP and A/D converter 316, and the normal camera exposure is set to provide 1 stop of overexposure latitude, so that the factory determined 18% signal level is set equal to code value 369.

In block 68, the second metric, "percent scene reflectance" 374 is calculated from the same area located by the luminometer crosshairs 362 that was used in determining the first metric "stops" 372. The "percent scene reflectance" 374 is calculated using equation 3.

$$\text{Percent Reflectance} = 18(Y/18P\text{Gray}) \qquad \text{(Eqn 3)}$$

where 18PGray is the factory determined 18% signal level.

In block 60 of FIG. 2, after these two metrics are calculated as just described related to FIG. 6, the "stops" 372 and "percent scene reflectance" 374 are displayed on the LCD image display 332.

In block 70, the photographer uses the information displayed by the luminometer 370, to make a judgment regarding the exposure level of the captured digital image. If the exposure level is too high, or too low, and therefore does not meet the photographer's needs, the photographer will manually adjust the camera settings based on the information provided by the luminometer (block 80), and capture a second image of the scene using the adjusted camera settings (block 90). For example, if the luminometer values 370 from the first captured digital image of a scene having an 18% gray card provide a −1 value for the "stop" value 372, this means that the exposure was 1 stop underexposed, relative to the factory determined 18% gray card values. In this case, the photographer can manually adjust the exposure settings of the digital camera 300 to provide twice as much exposure (e.g. 1 stop more exposure). This can be done by manually doubling the exposure time, or alternatively by increasing the aperture size by one stop (e.g. decreasing the f/number by 1 stop), or alternatively by doubling the effective ISO speed setting of the camera, or by an appropriate combination of these settings.

Figure 3:
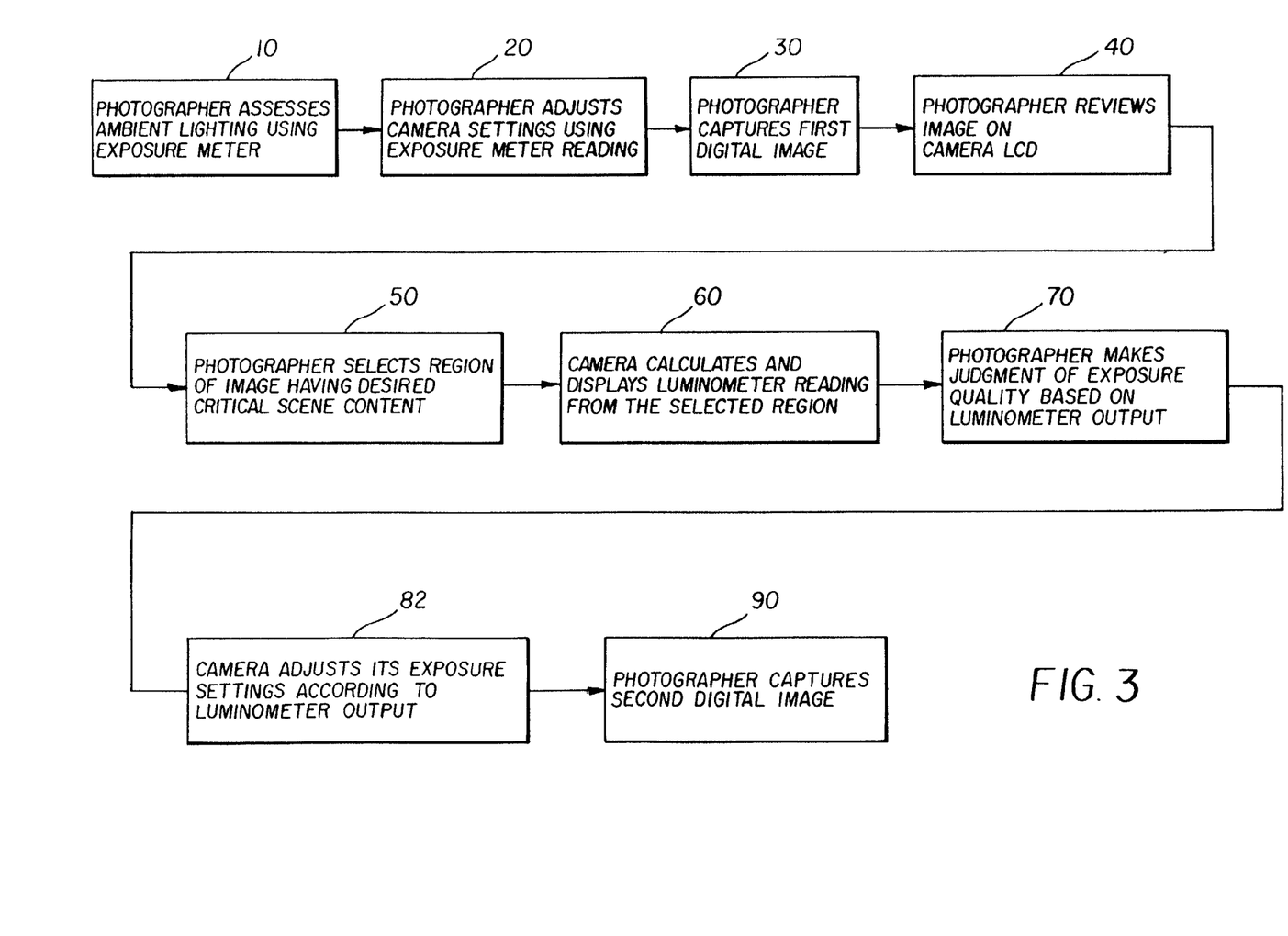
FIG. 3 is another flow diagram showing the steps of practicing the present invention in a different embodiment wherein the camera settings are automatically modified based on critical scene content in the first captured digital image.

FIG. 3 is a flow diagram showing the steps of practicing a second embodiment of the present invention. In block 10, the photographer prepares to capture a digital image as described earlier in reference to FIG. 2. Typically, this is done by first determining the amount of light falling on the scene using an incident light meter, or alternatively using a reflected light meter to measure the amount of light reflected from various portions of the scene. In controlled photography, such as studio photography, the photographer may arrange lighting in order to illuminate the scene in a desired manner.

In block 20, the photographer adjusts the camera settings based on the scene to be captured as described earlier in reference to FIG. 2. Typically, the photographer manually adjusts the camera settings based on the meter readings made in block 10, although the photographer may alternatively use the automatic exposure mode to automatically set the camera settings. The camera settings that can be adjusted include the camera's exposure time (e.g. camera shutter speed), the camera's effective ISO speed setting, and the lens aperture.

In block 30, the photographer uses the digital camera 300 to capture a first image of the scene, as described earlier in reference to FIG. 2.

In block 40, the photographer selects, using user controls 303, to display the captured image on the color LCD image display 332, as described earlier in reference to FIG. 2.

In block 50, the photographer selects a region of the displayed image having exposure critical scene content, so that the exposure related readings for this area of the scene can then be measured and displayed in block 60, as described earlier in reference to FIG. 2

In block 60, the digital camera 300 displays the luminometer values 370 on the color LCD image display 332 for the exposure critical scene content area of the image, selected in block 50. The manner in which the luminometer values are calculated and displayed on the LCD image display 332 are identical to that described in reference to block 60 in FIG. 2, and in reference to FIG. 6.

In block 70, the photographer uses the information displayed by the luminometer 370, to make a judgment regarding the exposure level of the captured digital image. If the exposure level is too high, or too low, and therefore does not meet the photographer's needs, the camera firmware will automatically calculate the camera adjustment necessary to modify the exposure by the number of "stops" indicated by the "stop" value 372.

In block 82, when the user selects the OK button 354, the control processor and timing generator 304 automatically adjusts the camera's exposure settings based on the information provided by the luminometer. The photographer then captures a second image of the scene using the adjusted camera settings (block 90). The photographer can also capture additional images using these same camera exposure settings.

For example, if the luminometer values 370 from the first captured digital image of a scene having an 18% gray card provide a −1 value for the "stop" value 372, this means that the exposure was 1 stop underexposed, relative to the factory determined 18% gray card values. In this case, the control processor and timing generator 304 will automatically adjust the exposure settings of the digital camera 300 to provide twice as much exposure (e.g. 1 stop more exposure). This may be done by doubling the exposure time, or increasing the aperture size (e.g. decreasing the f/number by 1 stop), or by adjusting the effective ISO speed of the camera. Typically, the 18% grey card is included in the first picture captured in block 30, so that it can be selected as the exposure critical scene content in block 50, and is then removed when the second digital image, and any additional images, are captured in block 90.

Figure 4:
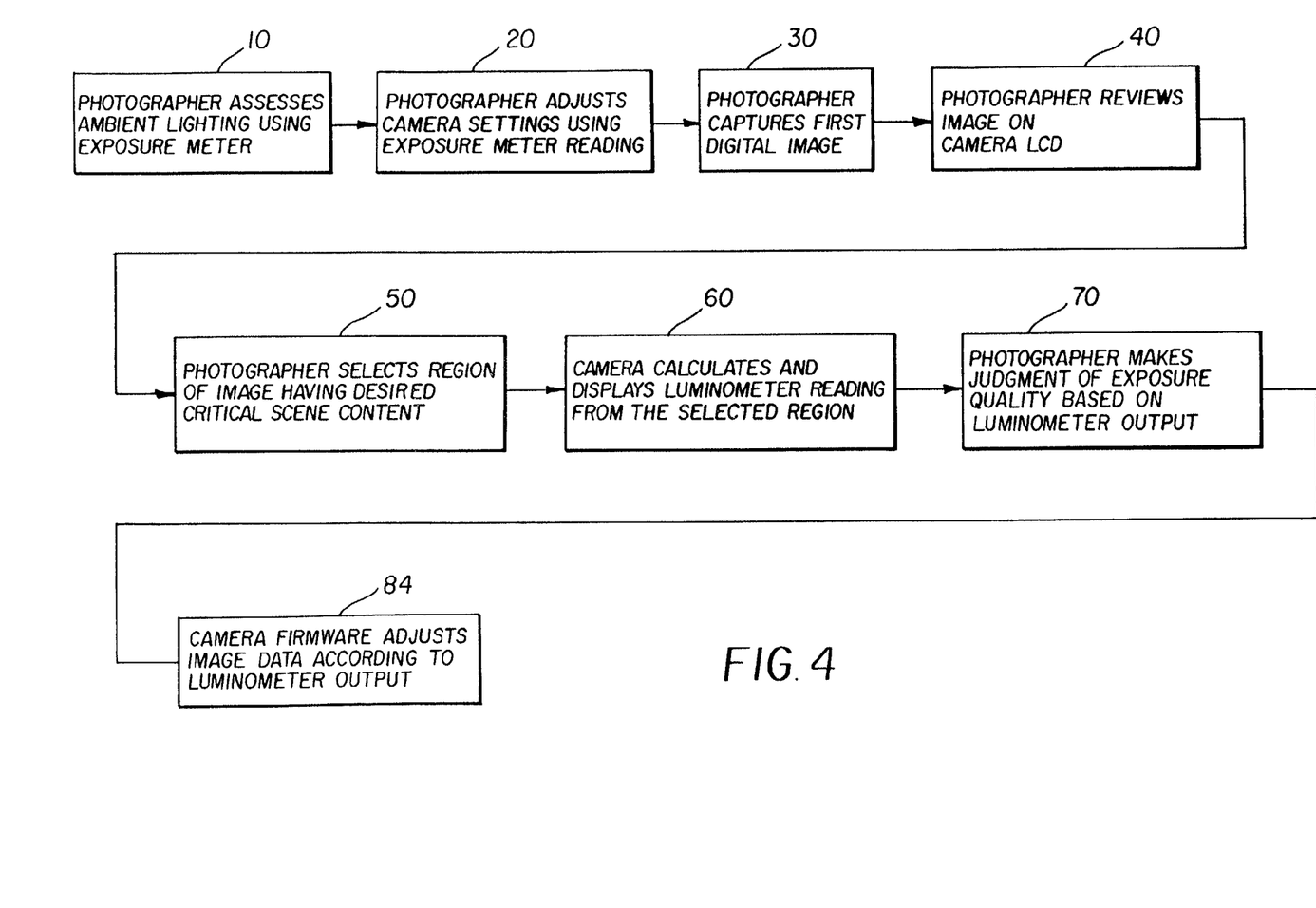
FIG. 4 is another flow diagram showing the steps of practicing the present invention in a different embodiment wherein the first captured digital image is adjusted based on critical scene content.

FIG. 4 is a flow diagram showing the steps of practicing a third embodiment of the present invention. In block 10, the photographer prepares to capture a digital image as described earlier in reference to FIG. 2. Typically, this is done by first determining the amount of light falling on the scene using an incident light meter, or alternatively using a reflected light meter to measure the amount of light reflected from various portions of the scene. In controlled photography, such as studio photography, the photographer may arrange lighting in order to illuminate the scene in a desired manner.

In block 20, the photographer adjusts the camera settings based on the scene to be captured as described earlier in reference to FIG. 2. Typically, the photographer manually adjusts the camera settings based on the meter readings made in block 10, although the photographer may alternatively use the automatic exposure mode to automatically set the camera settings. The camera settings that can be adjusted include the camera's exposure time (e.g. camera shutter speed), the camera's effective ISO speed setting, and the lens aperture.

In block 30, the photographer uses the digital camera 300 to capture a first image of the scene, as described earlier in reference to FIG. 2.

In block 40, the photographer selects, using user controls 303, to display the captured image on the color LCD image display 332, as described earlier in reference to FIG. 2.

In block 50, the photographer selects a region of the displayed image having exposure critical scene content, so that the exposure related readings for this area of the scene can then be measured and displayed in block 60, as described earlier in reference to FIG. 2.

In block 60, the digital camera 300 displays the luminometer values 370 on the color LCD image display 332 for the exposure critical scene content area of image selected in block 50. The manner in which the luminometer values are calculated and displayed on the LCD image display 332 are identical to that described in reference to block 60 in FIG. 2, and in reference to FIG. 6.

In block 70, the photographer uses the information displayed by the luminometer 370, to make a judgment regarding the exposure level of the captured digital image. If the exposure level is too high, or too low, and therefore does not meet the photographer's needs, in block 84 the processor 320 in the digital camera 300 can automatically adjust (e.g. modify) the image data based on output provided by the luminometer. The "stops" 372 metric is used to determine how to adjust the image data. Since the "stops" 372 metric is relative to 18% gray, the adjustment made to the image will be in a metric that is very familiar to professional photographers. In order to adjust the image, the captured image data will be processed using equation 4.

$$E\text{adjusted}(x, y) = 2^{(stops)} \times E\text{captured}(x, y) \quad \text{(Eqn 4)}$$

where "stops" is the value from Eqn 2. Ecaptured is the exposure value of each captured pixel of the x,y image array. E adjusted is the adjusted exposure value of each pixel of the x,y image array.

The adjustment processing provided by equation 4 adjusts the image for either under or over exposure that occurred at the time of capture, thus providing the user with a properly exposed image, relative to the factory determined 18% point. For example, if the luminometer values 370 from the first captured digital image of a scene having an 18% gray card provide a −1 value for the "stop" value 372, this means that the exposure was 1 stop underexposed, relative to the factory determined 18% gray card values. In this case, the processor 320 will automatically adjust the image data by multiplying the linear (e.g. exposure space) code values of the captured image by 2, to provide the equivalent of 1 stop more exposure).

The invention has been described in detail with particular reference to certain preferred embodiments thereof, but it will be understood that variations and modifications can be effected within the spirit and scope of the invention.

PARTS LIST

10 block
20 block
30 block
40 block
50 block
60 block
62 block
63 block
64 block
66 block
68 block
70 block
80 block
82 block
84 block
90 block
300 digital camera
302 flash
303 users controls
304 control processor and timing generator circuit
306 drivers
308 autofocus and autoexposure detectors
310 zoom and focus motor drives
311 aperture
312 zoom lens
313 shutter
314 image sensor
316 analog signal processing and analog-to-digital converter PARTS LIST (con't)

318 DRAM buffer memory
320 processor
322 host interface
324 memory card interface
326 RAM memory
328 firmware memory
330 removable memory card
332 color LCD image display
340 host PC
342 interface cable
350 4-way controller
352 cancel button
354 OK button
360 region of interest (ROI) box
362 crosshairs
370 luminometer values
372 stops exposure value
374 percent scene reflectance value

What is claimed is:

1. A method of improving a digital image captured by a digital camera, comprising the steps of:
   a) using the digital camera to capture and store in a non-volatile memory a first digital image of a scene and displaying the first captured and stored image on a display of the digital camera;
   b) providing a user interface which permits the digital camera user to select a portion of the displayed first captured and stored image, which the user identifies as having exposure critical scene content, on the display;
   c) producing a numerical value representative of exposure information from the user selected exposure critical scene content portion of the first captured and stored image and displaying the numerical value representative of the exposure information which permits the user to adjust an exposure value for capturing a second digital image of the scene captured by the first image; and
   d) adjusting the exposure value of the camera based on the numerical value representative of the exposure information and capturing and storing the second image of the scene in the non-volatile memory.

2. The method of claim 1, wherein selecting a portion of the displayed first captured and stored image includes a user zooming in on a particular portion of the displayed first image which the user identifies as having critical scene content.

3. The method of claim 2, further including providing a zoom window to allow the user to identify the region of interest.

4. The method of claim 3, further including analyzing pixels in the particular region of interest to produce the exposure information.

5. A method of improving a digital image captured by a digital camera, comprising the steps of:
   a) using the digital camera to capture and store in a non-volatile memory a first digital image of a scene and displaying the first captured and stored image on a display of the digital camera;
   b) providing a user interface which permits the digital camera user to select that portion of the displayed first captured and stored image, which has exposure critical scene content;
   c) producing a numerical value representative of exposure information from the user selected exposure critical scene content portion including photographic metrics of luminance values from the portion and displaying the numerical value representative of the exposure information on the display which permits the user to adjust an exposure value for capturing a second digital image of the scene captured by the first image; and d) adjusting the exposure value of the camera based on the metrics and capturing and storing the second image of the scene in the non-volatile memory.

6. The method of claim 5, wherein the metrics include relative scene reflectance.

7. The method of claim 5, wherein the metrics include exposure stop information.

8. The method of claim 7, wherein the exposure stop information is relative to a normal exposure level.

9. The method of claim 5, wherein selecting that portion of the displayed first captured and stored image includes a user zooming in on a particular portion of the displayed first image which the user identifies as having critical scene content.

10. The method of claim 5, further including providing a zoom window to allow the user to identify the region of interest.

11. The method of claim 5, further including analyzing pixels in the particular region of interest to produce the exposure information.

12. A method of improving a digital image captured by a digital camera, comprising the steps of:
a) using the digital camera to capture and store in a non-volatile memory a first digital image of a scene and displaying the first captured and stored image on a display of the digital camera;
b) providing a user interface identifying a region of interest in the displayed first captured and stored image and controls for user moving the region of interest to different positions on the displayed first captured and stored image which permits the user to select that portion of the displayed first captured and stored image, which has exposure critical scene content;
c) producing a numerical value representative of exposure information from the user selected portion of the first captured and stored image and automatically adjusting at least one camera exposure parameter to produce a second digital image; and
d) producing a second digital image based on the produced numerical value representative of the exposure information and storing the produced second digital image on the non-volatile memory.

13. The method of claim 12, further including capturing and storing in the non-volatile memory another image using the automatically adjusted camera exposure parameter.

14. A method of improving a digital image captured by a digital camera, comprising the steps of:
a) using the digital camera having a display to capture an image of a scene, to store the captured image in a non-volatile memory as a first digital image, and to display the first digital image on the display;
b) providing a user interface identifying a region of interest in the displayed first captured and stored image and controls for moving the region of interest to different positions on the displayed first captured and stored image which permits the user to select that portion of the displayed first digital image, which has exposure critical scene content;
c) producing a numerical value representative of exposure information from the selected portion and using the numerical value representative of the exposure information to automatically adjust the stored first digital image to produce a second digital image; and
d) producing a second digital image based on the produced numerical value representative of the exposure information and storing the second digital image in the non-volatile memory.

15. The method of claim 14, wherein identifying the region of interest includes a user zooming in on a particular portion of the displayed first image which the user identifies as having critical scene content.

16. The method of claim 14, further including providing a zoom window to allow the user to identify the region of interest.

17. The method of claim 14, further including analyzing pixels in the particular region of interest to produce the exposure information.

18. The method of claim 14, wherein the metrics include relative scene reflectance.

19. The method of claim 14, wherein the metrics include exposure stop information.

20. The method of claim 14, wherein the exposure stop information is relative to a normal exposure level.

21. The method of claim 12, wherein identifying the region of interest includes a user zooming in on a particular portion of the displayed first image which the user identifies as having critical scene content.

22. The method of claim 12, further including providing a zoom window to allow the user to identity the region of interest.

23. The method of claim 12, further including analyzing pixels in the particular region of interest to produce the exposure in formation.

* * * * *